United States Patent [19]

Seeliger

[11] Patent Number: 4,583,754

[45] Date of Patent: Apr. 22, 1986

[54] TRANSMISSION UNIT

[76] Inventor: Klaus Seeliger, Birkenkopfstr. 10, 3500 Kassel, Fed. Rep. of Germany

[21] Appl. No.: 656,923

[22] Filed: Oct. 2, 1984

[51] Int. Cl.$^4$ .............................................. B62M 1/14
[52] U.S. Cl. .................... 280/246; 74/100 R; 74/471 R; 74/496; 74/525; 188/78; 280/251; 280/252; 280/255; 280/264
[58] Field of Search ........... 280/242 R, 242 WC, 243, 280/244, 246, 251, 252, 253, 255, 258, 264; 74/43, 44, 97, 100 R, 143, 471 R, 496, 522, 525; 188/78, 24.22, 72.1

[56] References Cited

U.S. PATENT DOCUMENTS

| 667,232 | 2/1901 | Leaycraft | 280/264 |
|---|---|---|---|
| 1,681,438 | 8/1928 | Scourtes et al. | 280/263 |
| 3,481,437 | 12/1969 | Araikawa | 74/97 |
| 3,994,509 | 11/1976 | Schaeffer | 280/244 |
| 4,358,126 | 11/1982 | Mitchell et al. | 280/242 WC |
| 4,453,724 | 6/1984 | Lucken | 280/244 |

FOREIGN PATENT DOCUMENTS

| 2652182 | 5/1978 | Fed. Rep. of Germany | 280/242 WC |
|---|---|---|---|
| 2926212 | 1/1981 | Fed. Rep. of Germany | 280/244 |

Primary Examiner—John J. Love
Assistant Examiner—Charles R. Watts
Attorney, Agent, or Firm—Leonard Bloom

[57] ABSTRACT

A transmission for muscle-operated vehicles or appliances for converting forward and backward movements into rotational movement having a constant direction of rotation by means of two freewheeling devices which are driven alternately in opposite directions and act on a shaft in identical directions, wherein at least one additional freewheeling device is driven at the same time, though it operates in the opposite direction, a clutch mechanism either permitting the freewheeling devices to act in the same direction on the shaft for forward motion, or permitting the freewheeling devices to act in opposite directions on the shaft for reverse motion, or permitting none of the freewheeling devices to act on the shaft during idling.

10 Claims, 5 Drawing Figures

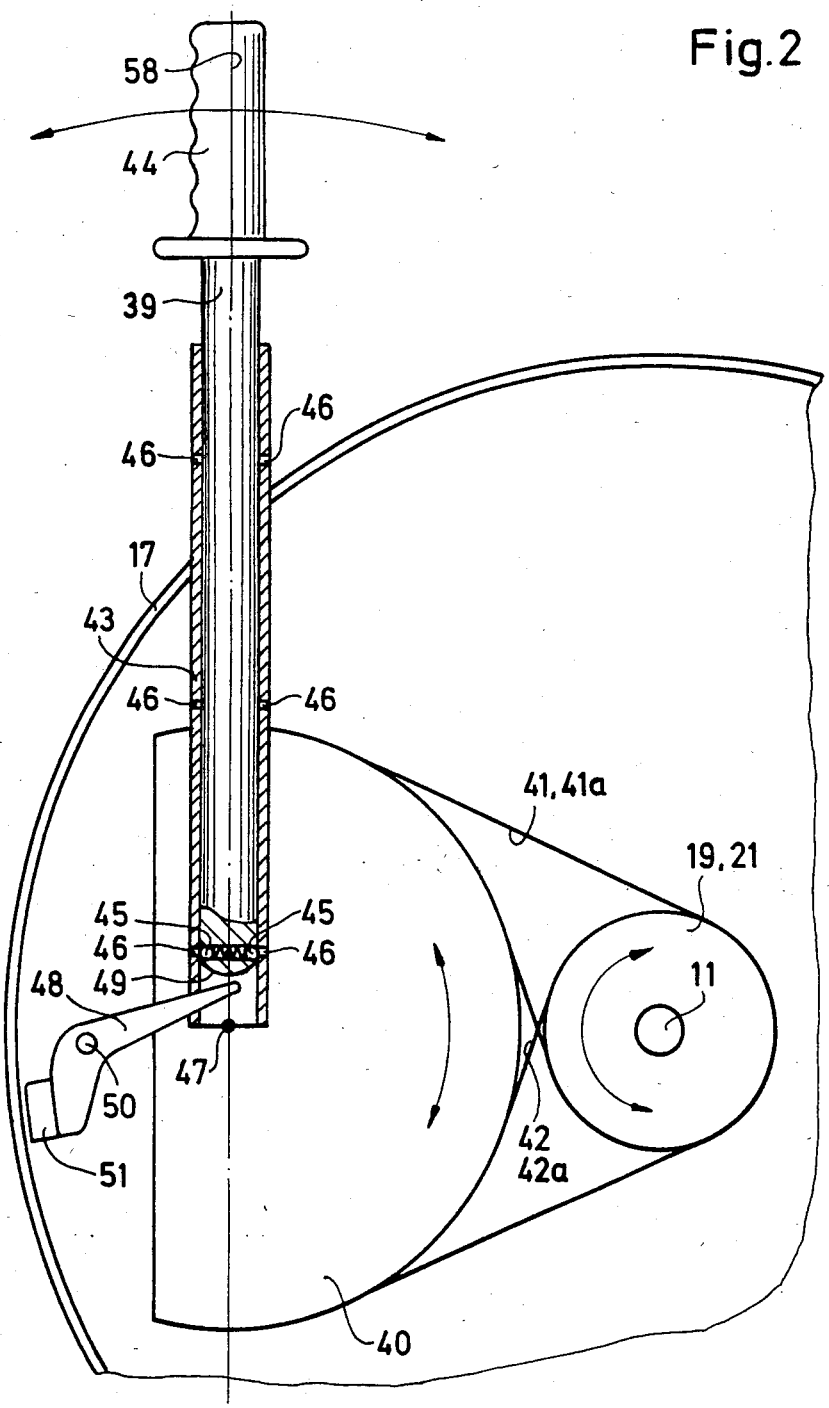

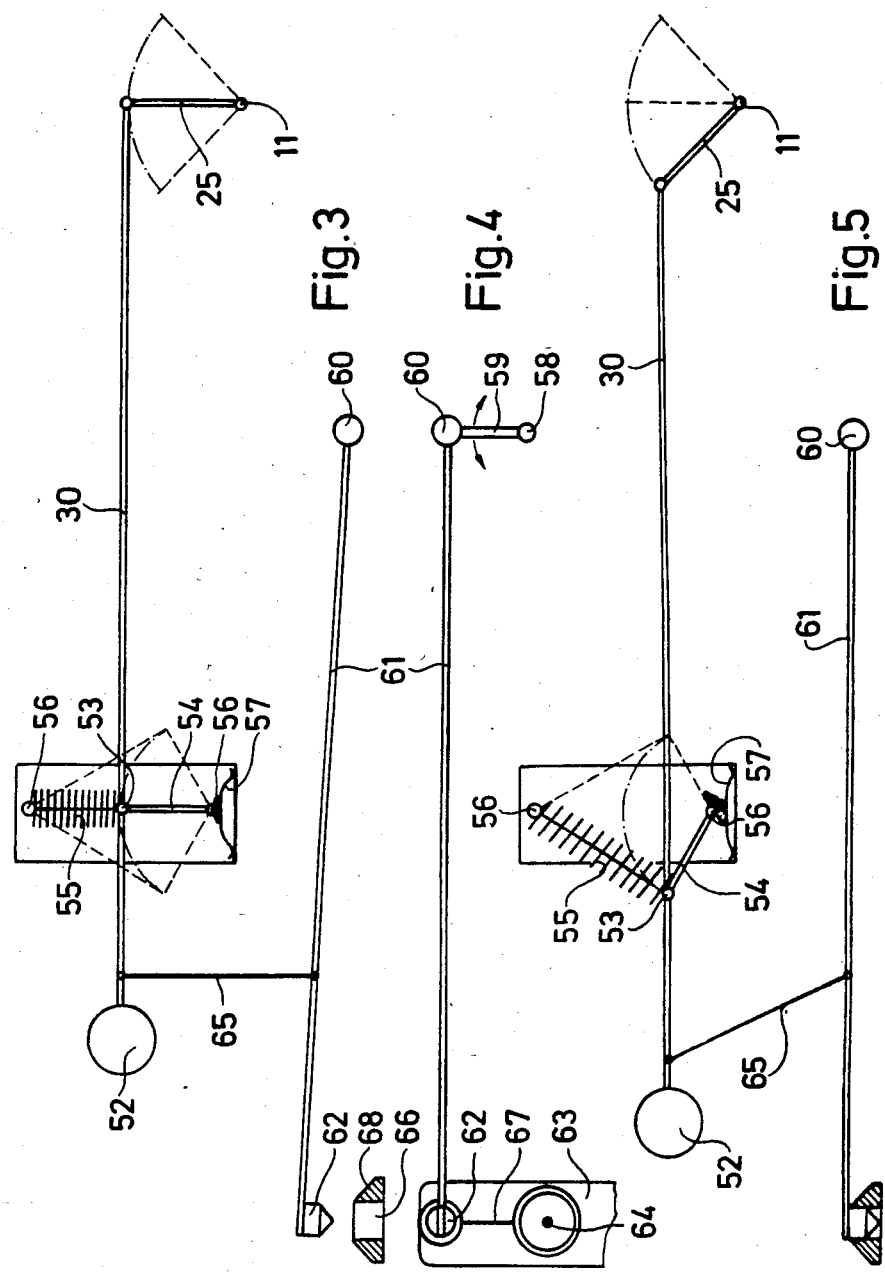

TRANSMISSION UNIT

The present invention relates to a transmission unit for muscle-operated or driven vehicles or appliances for converting forward and backward movements into rotational movement having a constant direction of rotation by means of two freewheeling devices which are driven alternately in opposite directions and act on a shaft cooperatively.

BACKGROUND OF THE INVENTION

To convert forward and backward movements into a rotational movement having a constant direction of rotation, transmission units are known from European Patent Publication No. 0 004 205A1 and U.S. Pat. No. 3,301,574, such transmission units having reverse motion and operating with direction-reversible adjusting ratchet mechanisms. However, these transmission units are disadvantageous because they only utilize one of the two driving movements for the rotational movement of the drive and they all include an idling stroke.

The invention seeks to provide a light-weight transmission unit of the above-described type which is as small as possible and in which the direction of movement is to be selectively converted into forward and backward movements without the need for idling to be bridged.

SUMMARY OF THE INVENTION

This object is achieved with a transmission unit as described above when at least one additional freewheeling device is driven at the same time, though it operates in the opposite direction, a clutch mechanism either permitting the freewheeling devices to act in the same direction on the shaft for forward motion, or permitting the freewheeling devices to act in opposite directions on the shaft for reversion motion, or permitting none of the freewheeling devices to act on the shaft during idling.

In addition to providing the two freewheeling devices which have the same direction of rotation and are used for forward motion, it is preferable to provide at least one further freewheeling device which has an opposite direction of rotation. All of the freewheeling devices do not act directly on the drive shaft, but the two freewheeling devices which have the same direction of rotation act on components of the clutch including a forward drive tube which is intended for forward motion, and the freewheeling device which operates in the opposite direction acts on an internal ring which is in the form of a reverse drive tube for backward motion. Both internal tubes may selectively be connected to a hollow shaft, serving as a drive shaft, by means of shift splines or remain disconnected from the hollow shaft during idling.

It is also preferable for the driving lever of the transmission unit to be connected to the freewheeling devices via an open cable drive and a crossed cable drive so that the freewheeling devices can always be driven in opposite directions to one another. In addition, the driving lever may be used to actuate the brake when it is displaced towards its pivot point and may be used for steering purposes when it rotates about its longitudinal axle. Also, by connecting the shift rod and the steering rod, it is ensured that positive steering becomes effective during forward and backward motion and automatic steering of the muscle-operated vehicle becomes effective during idling.

Additionally preferred embodiments of the invention are described in the claims.

BRIEF DESCRIPTION OF THE DRAWINGS

FIG. 2 is a side elevational view of the driving lever which is connected to the transmission unit;

FIG. 3 is a schematic, side elevational view of the shift rod in its idling position with a released steering wheel;

FIG. 4 is a plan view of the connection between the steering rod and steering wheel fork; and FIG. 5 is a schematic, side elevational view of the shift rod shown when the steering rod is locked into the steering wheel fork.

DETAILED DESCRIPTION OF PREFERRED EMBODIMENT

Figure 1:
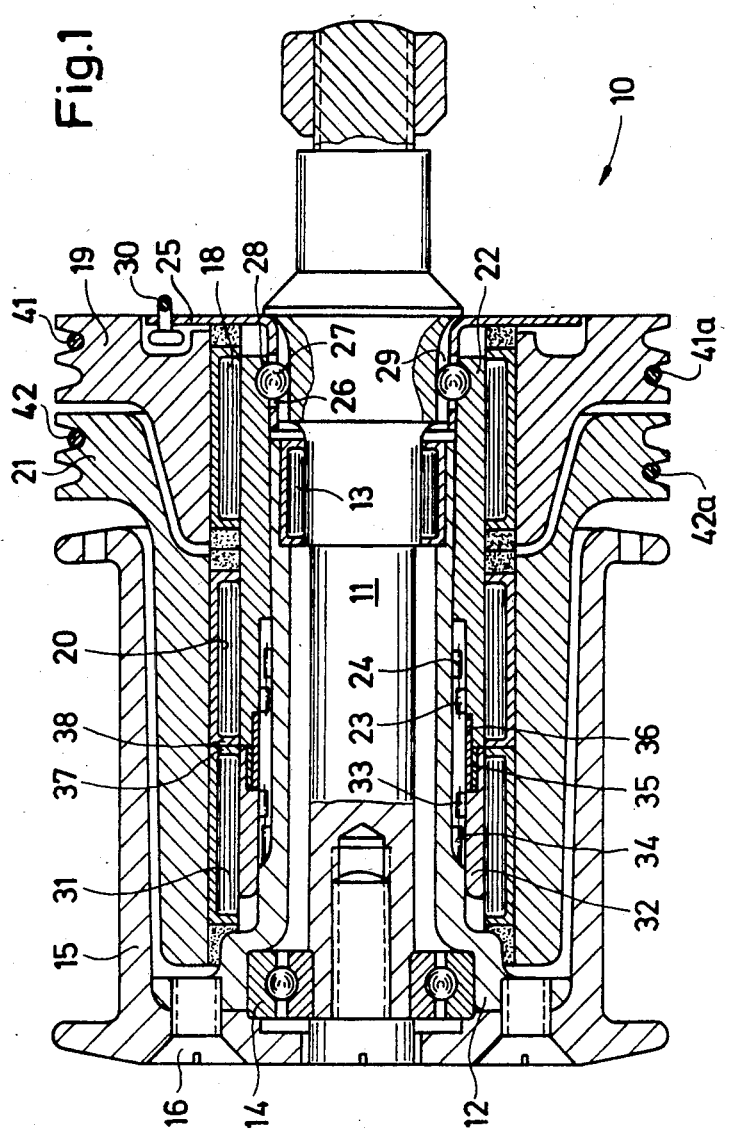
FIG. 1 is a vertical, semi-sectional view of the transmission unit provided with wheel hub and freewheeling devices.

A transmission unit 10 is rotatably mounted on a stub-shaft 11 of a vehicle, for example a wheelchair, by means of antifriction bearings 13 and 14 on a hollow shaft 12. A wheel hub 15 is secured to this hollow shaft 12 by means of screws 16 or similar securing means, and the spokes (not shown) are secured to the wheel hub 15 in conventional manner for a wheel rim 17 of a muscle-operated vehicle, such as a wheelchair or the like. The wheel hub 15 constitutes the driven member of the transmission unit 10. A first free-wheeling device 18 is disposed within the wheel hub 15 and is driven by a wheel, for example a cable wheel 19. A second free-wheeling device 20 is disposed adjacent the first free-wheeling device and is driven by a second cable wheel 21. The free-wheeling devices 18 and 20 are mounted so that they operate in the same direction of rotation, whilst the two cable wheels 19 and 21 are driven in oscillating manner in opposite directions and provide for the forward movement of the wheel hub 15.

The switchable idling movement is effected in that the two free-wheeling devices 18 and 20 do not act directly on the shaft 12 but act on an internal ring 22 which is in the form of a forward drive tube. In the position shown in FIG. 1, the forward drive tube 22 can rotate on the hollow shaft 12 without causing said shaft to rotate therewith. The forward sleeve 22 is therefore in its idling position. Coupling elements, such as the internal spline 23 of the forward drive tube 22 which engages in an external spline 24 of the hollow shaft 12 when the forward sleeve 22 is displaced to the right, permit the hollow shaft 12 to be carried along by the forward sleeve 22. Such displacement may be effected by rotating a shift bushing 25 on the stub shaft 11 since the periphery of said shift bushings is provided with three or more axially inclinedly extending slots 26 which accommodate balls 27 guided externally in the annular groove 28 formed in the forward sleeve 22 and guided internally in longitudinal slots 29 formed in the stub shaft 11. The shift rod 30 may effect rotation of the shift bushing 25.

To achieve backward motion, a further free-wheeling device 31 in addition to the freewheeling device 20 is provided in the cable wheel 21 and is mounted in the cable wheel 21 so that its direction of rotation is opposite that of the freewheeling device 20. This freewheeling device 31 acts on the reverse drive tube 32 which is in the idling position shown in FIG. 1 and may rotate freely on the hollow shaft 12. During axial displacement of the reverse drive tube 32 to the left, however, its internal toothing 33 engages in an external spline 34 of the hollow shaft 12, and in consequence the freewheeling device 31 can rotate the hollow shaft 12, such rotation being in the reverse direction of rotation. In cooperation with a flanged ring 36 which is pressed securely into the forward sleeve 22 (internal ring), the retaining ring 35 which is pressed securely into the reverse sleeve 32 ensures that the reverse drive tube 32 is able to participate in the axial displacement of the forward drive tube 22, though it can rotate independently of said forward sleeve. During axial displacement to the right (forward gear), the reverse drive tube 32 may slip into the "wrong" freewheeling device 20. This situation is remedied by means of a bevelled portion 37 of the reverse drive tube 32. The same applies to a bevelled portion 38 of the forward drive tube 22.

The reverse gear, which is provided by the freewheeling device 31, is only a single-acting mechanism which is only active in the push or pull stroke of a driving lever 39 (see FIG. 2). This is sufficient because the reverse gear is not used very often. If a double-acting reverse gear were desired, an additional fourth freewheeling device would have to be inserted in the cable wheel 19. As shown in FIG. 1, the double-acting forward gear, the single-acting reverse gear and the idling device, including the shift mechanism, have very small dimensions and are therefore accommodated in a weight-saving manner in the wheel hub 15. The width of the transmission 10, which substantially results from the width of the three freewheeling devices 18, 20 and 31, produces a flanged spacing from the wheel hub 15, which spacing corresponds to that of conventonal wheel rims 17 of muscle-operated vehicles.

According to the above-described transmission principle, the cable wheels 19 and 21 always have to be driven so that they oscillate in opposite directions. If they were to end in toothed wheels, they could be driven with a double toothed rod. If they were to end in levers, they could each be driven by a push-rod. Toothed wheel drives, chain drives or belt drives are also possible. As shown in FIG. 2, cable drives are even simpler, more space-saving and more economical. While one cable wheel 19 is connected as a looped drive to a larger semi-circular wheel 40, the cable wheel 21 which is disposed upstream thereof and has a crossed looped drive acts on a larger semi-circular wheel 40. This causes the cable wheels 19 and 21 always to rotate in opposite directions to one another with every forward and backward movement of the larger semi-circular wheel 40. The basic gear ratio, which is appropriate for the particular purpose, e.g. wheelchair drive, is produced by the diameter ratio of the small cable wheels 19 and 21 relative to the larger semi-circular wheel 40. It is possible to achieve other gear ratios easily by providing the semi-circular wheel 40 with other diameters, without meshing with the transmission 10 shown in FIG. 1. Since all of the cable wheels 19, 21 and 40 only execute oscillatory movements, the ends of the cables 41, 41a, 42 and 42a are secured to the semi-circular wheel 40 and the cable wheels 19, 21 in a locking manner. A tubular driving sleeve 43 is secured to the larger semi-circular wheel 40, and a driving lever 39 is detachably mounted in said driving sleeve and has a handle 44. A pre-determined lever length can be ensured by spring-mounted balls 45 in the driving lever 39, in association with openings 46 in the driving sleeve 43, and such balls mark, so to speak, the first, second and third gears. Provided that the arc length and operating frequency at the driving lever 39 are constant, this alteration of the lever length constitutes a genuine gear shift, that is to say, a longer lever produces a greater torque at lower speed.

Because of the above-mentioned diameter ratio between the cable wheels 19, 21 and 40 and because of the minimum radius of the curvature of the cables 41 and 42, the fulcrum or pivot point 47 of the larger wheel 40 is situated in the vicinity of the wheel rim 17, said rim being connected to the wheel hub 15 by means of spokes and, in consequence, rotating about the half-shaft 11. In the additional embodiment of the transmission, this arrangement is used to operate, by means of the handle 44, a brake which is independent of the angular position of the semi-circular wheel 40 and its driving lever 39. This is achieved when the top of the brake lever 48 is situated in the vicinity of the pivot point 47 of the semi-circular wheel 40 and, by displacing the driving lever 39 with its end face 49, the brake lever 48 can be rotated about the axle 50 so that the brake lining can be pressed against the wheel rim 17 when the handle or hand grip 44 is depressed with a greater or smaller force. This produces a radial pressure on the wheel rim 17. With greater exertion, an axial pressure on the wheel rim 17 may also be realized instead.

A further improvement of the transmission is achieved when the shift rod 30 actuates the shift bushing 25. Since the arrangement shown in FIG. 1 does not have synchronising means for the splines 23, 24 and 33, 34, the ends of said toothings may protrude above one another during shifting, so that no meshing occurs. If the splines moved slowly relatively to one another, the shifting operation would have to be effected by touch so that the splines could enter the gaps for the teeth.

It is more advantageous if the gears can be preselected by means of a rocker switch which is shown in FIGS. 3 and 5. In FIG. 3, the shift bushing 25 is in its idling position. For comfortable operation, the shift rod 30 is provided with a ball handle 52. A toggle lever 54 and a compression spring 55 are mounted in a pivot joint 53 on the shift rod 30, and said compression spring is supported, in turn, at the fixed pivot point 56. Since the points of application of the toggle lever 54 and the compression spring 55 are in alignment in FIG. 3, the system is in metastable equilibrium. After slight pulling on the ball handle 52 to the left (see FIG. 5), the compression spring 55 presses further to the left and pulls with it the toggle lever 54, the shift rod 30 and the shift bushing 25. If the toothings 23 and 24 protrude one another in such a case, the position which is sketched in FIG. 5 is not reached immediately, but, after slight relative movement of the splines 23 and 24, said toothings automatically mesh with the influence of the compression spring 55 without the need for the ball handle 52 to be additionally operated. Preselection of the reverse gear is also effected in a similar manner: By pressing the ball handle 52 over the position shown in FIG. 3 to the right, the compression spring 55 snaps further to the right, so that the shift bushing 25 is pressed into the reverse position via the shift rod 30. In this case also, the splines 33 and 34 automatically mesh with one another. A leaf spring 57, for example, may be provided as an additional means of ensuring the metastable equilibrium for the idling position shown in FIG. 3.

When the transmission 10 which is described here is used for a conventional wheelchair, the idling position sketched in FIG. 3 is adopted so that this wheelchair can be driven in conventional manner by means of its grip tyres because the transmission 10 is disconnected when there is no meshing of teeth. In such a case, the driving lever 39 may be pivoted into a position which does not interfere with actuation of the grip tyres. Grip tyre driving is particularly suitable for driving in a room and in a tight space. In such a case, the steering wheels of the wheelchair can automatically rotate through 360° C. When driving in open spaces, however, it is considerably more appropriate for the wheelchair to be driven by hand levers. However, steering may prove difficult on roads which have to be travelled and which slope transversely to the direction of travel. The steering wheels, which are then set downhill, are advantageously forcibly steered via the driving sleeve 43 which is mounted on the larger semi-circular wheel 40 and is rotatable about the longitudinal axle 58 (see FIG. 2). Because the arm 59 is secured to the driving sleeve 43 on a level with the pivot point 47 (see FIG. 4), the steering wheel fork 63 is rotated about its axis of rotation 64 via a ball joint 60 and a steering rod 61 by means of its pin 62, this being effected by rotation of the hand grip 44. This type of steering, however, is only desirable for a set forward or reverse gear. For this reason, the steering rod 61 may be separated from the steering wheel fork 63 (see FIG. 3), this being effected by a mechanical connection, for example a cable-like mechanical connection 65, between the steering rod 61 and the shift rod 30 while, for the idling position, the toggle lever 54 brings the shift rod 30 into a higher position, thereby also raising the steering rod 61, so that its pin 62 separates from the opening 66 in the steering wheel fork 63. By pressing the ball handle 52 into the forward or reverse gear, the shift rod 30 is lowered, as is the steering rod 61, so that its pin 62 can be inserted into the opening 66 in the steering wheel fork 63. However, the steering wheel fork 63 may have been rotated about its rotational axle 64, so that the pin 62 plunges into an empty space. For this reason, the pin end of the steering wheel rod 61 is secured by the double ring 67 so that it is rotatable about the rotational axles 64, and the steering wheel fork 63 is provided with inclinations 68 which, together with the tip of the pin 62, cause the pin 62 to be automatically threaded into the opening 66 in the wheel fork 63 during rotation of the wheel fork 63. Because of this connection between the shift rod 30 and the steering rod 61, a changeover from automatic steering to compulsory steering is effected without further assistance by pre-selecting the transmission 10 into forward or reverse gear. The changeover from compulsory steering to automatic steering is effected by switching the transmission unit 10 into its sliding position.

I claim:

1. A transmission for muscle-operated vehicles or appliances for converting forward and backward movements into rotational movement having a constant direction of rotation comprising a first and a second freewheeling device, each having a plurality of one-way roller bearings which impinge on a forward drive tube and which are driven alternately in opposite directions and thereby act cooperatively on a hollow shaft; the hollow shaft having first and second external splines and being located centrally of the forward drive tube and supported by a central stub shaft having axial grooves; a clutch comprising said forward drive tube having an internal annular groove and a third internal spline, and a reverse drive tube rotatably secured to the forward drive tube having a fourth internal spline, the first and second freewheeling devices driving the forward drive tube in one directiion of rotation and freewheeling in the other direction, wherein at least one additional freewheeling device is driven at the same time, though it operates in the opposite direction on the reverse drive tube of the clutch, the clutch mechanism either permitting the freewheeling devices to act in the forward direction on the hollow shaft for forward motion when the first and third splines are engaged, or permitting the third freewheeling device to act in the opposite direction on the hollow shaft for reverse motion when the second and fourth splines are engaged, or permitting none of the freewheeling devices to act on the hollow shaft during idling when the splines are disengaged.

2. A transmission as recited in claim 1, wherein said third freewheeling device is provided as the reverse gear and the splines of the drive tubes and the splines of the hollow shaft are controllable via a shift bushing; the shift bushing comprising a collar disposed between the stub shaft and the forward drive tube having slots formed therein inclined to the axis of rotation and having balls located in the slots and nesting in the axial grooves and in the circumferential groove of the forward drive tube such that rotation of the shift bushing causes the axial displacement of said balls and thereby the axial displacement of the forward and reverse drive tubes, and where rotation of the shift bushing is accomplished by means of a shift rod.

3. A transmission as recited in claim 1, wherein the first and second freewheeling devices rest on the drive tubes and are drivable in opposite directions via cable wheels mounted upon the freewheeling devices, by means of cables which are connected to a semi-circular wheel, the reverse drive tube being mounted axially of the forward drive tube.

4. A transmission as recited in claim 3, wherein the reverse drive tube, located centrally of the third freewheeling device is provided with internal splines which are engageable with external splines of the hollow shaft for driving a wheel hub rigidly mounted on the hollow shaft and is drivable via the cable wheel.

5. A transmission as recited in claim 4, wherein the drive tubes have splines which are engageable with external splines of the hollow shaft for driving the wheel hub for forward motion, and idling occurs if none of the splines are engaged.

6. A transmission as recited in claim 5, wherein one cable wheel is drivable by means of a crossed-over cable, a semi-circular wheel being forwardly and backwardly displaceable about its axis of rotation via a driving sleeve secured thereto, the ends of the cables being secured in form-fitting manner to the cable wheels and the semi-circular wheel, and wherein the driving sleeve is adapted to telescopically receive an extensible driving lever.

7. A transmission as recited in claim 6, wherein the shift bushing is connected to a shift rod and rotatably mounted about the stub shaft, the clutch being axially displaceable by means of the inclined extending slots formed in the shift bushing for meshing of the splines.

8. A transmission as recited in claim 7, wherein the shift rod has a ball handle on its end remote from the shift bushing, the shift rod being connected in the region of said ball handle to a compression spring and a toggle lever via a pivot joint and, when the transmission unit is in its idling position, the compression spring forms a vertical axis with the toggle lever.

9. A transmission as recited in claim 8, wherein the displacement movement of the shift rod assists, by means of the compression spring, the meshing of the splines for the forward or reverse engagement positions, the shift rod being connected to a steering rod so as to accomplish detachable connection of a steering wheel fork.

10. A transmission as recited in claim 9, wherein the driving lever, which is guided in the driving sleeve, actuates a brake lever by vertical displacement, the brake lining of said brake lever acting on the rim of the wheel hub and the brake lever having, on a level with the pivot point, an arm which, for the purpose of rotating the driving lever about its axis, pivots the steering rod until it is secured to the steering wheel fork.

* * * * *